(12) United States Patent
Abbott et al.

(10) Patent No.: US 7,842,348 B2
(45) Date of Patent: Nov. 30, 2010

(54) HIGH YIELD SPRAY APPLICATION

(75) Inventors: Michael Abbott, Baltimore, MD (US);
Dennis M. Hilton, Nashua, NH (US);
Keith Lipford, Severna Park, MD (US);
Karl Taub, Arlington, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 968 days.

(21) Appl. No.: 11/335,426

(22) Filed: Jan. 19, 2006

(65) Prior Publication Data
US 2006/0177590 A1 Aug. 10, 2006

Related U.S. Application Data

(60) Provisional application No. 60/650,241, filed on Feb. 4, 2005.

(51) Int. Cl.
B05D 1/00 (2006.01)
B05D 1/02 (2006.01)
B05B 12/00 (2006.01)
B05B 12/08 (2006.01)

(52) U.S. Cl. .................. 427/403; 427/402; 427/421.1; 427/427; 427/373; 239/1; 239/71; 239/75; 239/419

(58) Field of Classification Search .............. 427/402, 427/403, 421.1, 373, 372.2, 427; 239/1, 239/8, 9, 71, 74, 75, 418, 419, 419.3; 134/18, 134/56, 57, 34, 56 R, 42
See application file for complete search history.

(56) References Cited

U.S. PATENT DOCUMENTS 4,616,306 A * 10/1986 Kuzma et al. ................. 700/19

(Continued)

FOREIGN PATENT DOCUMENTS

DE 4307379 C1 * 7/1994

(Continued)

OTHER PUBLICATIONS

The Nordoser 900 accelerator dosing system, http://www.normet.fi/?PRODUCTS:SPRAYING:The_Nordoser_900_accelerator_dosing_system, Printed Jan. 24, 2005.

(Continued)

*Primary Examiner*—Michael Cleveland
*Assistant Examiner*—Robert Vetere
(74) *Attorney, Agent, or Firm*—Benjamin Williams; Craig K. Leon; Stephan P. Williams

(57) ABSTRACT

Method and device for ensuring high yields during spraying of a settable slurry composition. The slurry is conveyed through a length of hose to a nozzle spray-orifice, and a set accelerator is introduced into the slurry at a distance "D" from the nozzle spray-orifice. The level of accelerator is monitored using a sensor located in the slurry path at a point after the set accelerator is injected. A preferred sensor comprises two pairs of conductivity sensors each having an annular body with a bore corresponding to the diameter of the hose or nozzle bore. Voltage of the slurry can be correlated to yields obtained when a salt-based accelerator fluid is injected into the slurry, such that levels of accelerator can be finely adjusted, and consistently high yields of spray coatings can be achieved.

16 Claims, 1 Drawing Sheet

U.S. PATENT DOCUMENTS

| | | | | |
|---|---|---|---|---|
| 4,734,649 | A | * | 3/1988 | Barnaby .................... 324/376 |
| 4,751,024 | A | | 6/1988 | Shu et al. .................... 252/601 |
| 4,904,503 | A | | 2/1990 | Hilton et al. ................ 427/373 |
| 4,934,596 | A | | 6/1990 | Hilton et al. .................... 239/8 |
| 5,034,160 | A | | 7/1991 | Kindt et al. ................. 252/604 |
| 5,203,919 | A | | 4/1993 | Bobrowski et al. .......... 106/802 |
| 5,340,612 | A | | 8/1994 | Perito ......................... 427/403 |
| 5,413,819 | A | | 5/1995 | Drs ............................. 427/427 |
| 5,520,332 | A | | 5/1996 | Gaidis et al. .................... 239/8 |
| 5,536,151 | A | | 7/1996 | Von Eckardstein .......... 417/429 |
| 5,556,578 | A | | 9/1996 | Berneburg et al. .......... 252/604 |
| 6,045,730 | A | | 4/2000 | Potter |
| 6,162,288 | A | | 12/2000 | Kindt et al. .............. 106/18.11 |
| 6,224,250 | B1 | * | 5/2001 | Kreinheder et al. ............ 366/8 |
| 6,406,755 | B1 | | 6/2002 | Kindt et al. |
| 6,780,230 | B2 | | 8/2004 | Hilton et al. ................. 106/122 |
| 2003/0125405 | A1 | | 7/2003 | Hilton et al. .................. 521/50 |

FOREIGN PATENT DOCUMENTS

JP  52-125526  * 10/1977

OTHER PUBLICATIONS

The MBT Knowledge Base, MBT-Knowledge Base (p. 35), http://www.mbtaus.com.au/whatsnew/new35,htm, Printed Jan. 31, 2005.
International Search Report for PCT/US2006/001737 dated Aug. 23, 2007, 2 pages.
Written Opinion of The International Searching authority for PCT/US2006/001737 dated Aug. 23, 2007, 4 pages.
International Preliminary Report on Patentability (Chapter I) for PCT/US2006/001737 dated Sep. 18, 2007, 5 pages.

* cited by examiner

HIGH YIELD SPRAY APPLICATION

This application claims the benefit of U.S. Provisional Application No. 60/650,241 filed on Feb. 4, 2005.

FIELD OF THE INVENTION

The invention relates to spray application of rapid-setting compositions, and more particularly to a method and device for ensuring high yield spray application of a settable composition through accurate monitoring of the level of a set accelerating agent introduced into the spray composition.

BACKGROUND OF THE INVENTION

Spray applications are known which involve the use of an accelerating agent introduced into a composition after conveyance through a hose. In particular, the composition being pumped through the hose is a hydratable cementitious particle slurry or suspension which is expelled through a spray nozzle onto a substrate. For example, such accelerating agents are used in the spray-application of concrete (e.g., "shotcrete") and fire protection coatings for metal substrates such as steel beams and panels.

A particularly successful type of product in the fire protection field is a gypsum-based slurry formulation that contains, in addition to the gypsum binder, a lightweight inorganic aggregate, such as shredded expanded polystyrene, vermiculite, and/or cellulose, along with an air entrainer and other agents. Fireproofing mixes such as the MONOKOTE® brand fireproofing from Grace Construction Products, Cambridge, Mass., are sold as a dry powder. The powder is mixed with water at the job site using a mixer that is situated at ground level. The fireproofing slurry is then pumped through a long hose which sometimes extends to a location 20 to 30 stories above ground level. It is sprayed through a nozzle onto a steel beam, panel, or other construction surface.

As explained by Hilton et al. in U.S. Pat. No. 4,904,503, the slurries must possess a number of important properties for spray application. They must adhere to the metal substrate in both the wet slurry state and after setting. They must set without undue expansion or shrinkage in order to avoid crack formations that could undermine the insulative properties of the coating. The slurry compositions must be able to hold a relatively large quantity of water so that they can be pumped easily and to great heights. Yet, the slurries must retain a consistency so as to avoid segregation or settling of ingredients.

From an economic viewpoint, it is important that the sprayable slurry provide an adequate "yield." The term "yield" means the volume of applied fireproofing composition, after setting, per given weight of dry mix used to prepare the fireproofing composition slurry.

To increase yield, Hilton et al. disclosed in U.S. Pat. No. 4,904,503 that an acidic set accelerator could be injected into the cementitious slurry to react with a basic material contained therein. The reaction provides carbon dioxide gas for foaming and expanding the slurry composition, thereby providing a substantial increase in yield of the slurry after setting. In the '503 patent, it was suggested that the accelerator be introduced into the slurry close to the nozzle to minimize the potential for hardening of the accelerated mix in the feed line during pumping.

The use of an accelerator has been known to convert the setting time of the slurry mix from about 4 to 12 hours to less than about 15 minutes, and it is often preferred to employ an amount of accelerator sufficient to obtain a setting time of about 5 to 10 minutes and also to obtain a yield increase in the range of 0.1% to 20%.

Volumetric flow metering techniques have been used in the spray application of gypsum-based fireproofing as well as sprayed concrete (shotcrete) to control the amount of set accelerator introduced into the slurry. For example, it is believed that flow meters have been used for introducing an alum accelerator into the hose during the spray-application of gypsum-based fireproofing. As another example, a volumetric flow metering systems are commercially available from Normet Corporation under the trade name Nordoser 900™ and from MBT Pty Ltd of Australia under the trade name Viper Roboshot MkIII for use in sprayed concrete applications.

The present inventors, however, believe that the use of flow meters do not necessarily guarantee accurate monitoring where lengthy hoses are required for application of the slurry onto substrates. A sufficient level of accuracy is especially harder to attain where the distances between the mixer and nozzle are great. For example, a high-rise construction site requires several hundred feet of slurry hose to be employed. This means that several hundred feet of small diameter tubing will also be required for pumping the set accelerator to or near the spray nozzle. Accordingly, the hose path from the mixer at ground level to the spray nozzle may span the distance of 10 to 30 stories or more above ground level. The path usually involves winding and circuitous routes around several obstacles and sharp edges. Typical obstacles for the accelerator tubing include door and wall openings, stairwells, and metal studs. The tubing is susceptible to pinching, kinking, collapsing, leaking, and other conditions that prevent a controlled introduction of set accelerating agent into the slurry.

An objective of the present invention, therefore, is to provide a method and device for accelerator injection and monitoring that provide accurate monitoring of accelerator levels actually introduced into the slurry.

Another objective is to provide an accelerator monitoring method and device that can withstand the corrosive effect of cementitious compositions on metering equipment and pluggage effect on the accelerator injector; that employ cleaning methods using current line cleaning methods; and that involve un-obtrusiveness to the spray operation.

A still further objective is to provide a device that can withstand the hazards of the industrial work environment. For example, the accelerator monitoring device should be able to withstand repeated drops onto hard surfaces without any loss in accuracy or effectiveness.

Finally, an important objective of the present invention is to provide a method and device for obtaining consistently high yield spray application of a settable composition using a set accelerator agent that is injected into the hose-conveyed composition being spray applied.

SUMMARY OF THE INVENTION

The present invention provides a method and device for achieving consistently high yield spray application of settable slurry compositions.

A exemplary method comprises conveying a settable slurry through a length of hose to a nozzle spray-orifice; introducing a set accelerating agent into said the slurry at a distance "D" from the nozzle spray-orifice; and monitoring the level of set accelerating agent in the slurry, at a distance less than "D" from said nozzle spray-orifice, by employing a sensor to detect changes in a physical property of the slurry corresponding to levels of set accelerating agent.

The set accelerating agent (or "accelerator") may be introduced into the slurry by known means. In fireproofing spray applications, an injection port may be used for injecting the accelerator pumped under pressure into the hose or into the nozzle.

For fireproofing spray applications, the accelerator is preferably injected into the slurry as a water-solubilized salt, and the sensor is preferably an electrical conductivity sensor operative, in combination with a voltage meter or other device, to provide an indication of the conductivity of the slurry. An exemplary conductivity sensor comprises a first pair of electrodes, preferably having an annular body (such as a hollow cylinder shape), which are operative to generate a voltage field when attached to a voltage source, and a second pair of electrodes, each also preferably having an annular body, located between the first electrode pair, are operative to detecting voltage differences between the first electrode pair when the second electrode pair is connected to a volt meter or other measuring device.

The sensor can be installed in the hose or nozzle at a distance "D" e.g., six inches to one hundred feet) from the nozzle spray-orifice at a point after the injection port through which the accelerator is injected into the hose or nozzle. Preferably, the sensor is housed in a sleeve housing at a distance which is at least five feet, and more preferably at least ten to seventy-five feet from the nozzle spray-orifice, so as to minimize opportunities for damaging the sensor mechanism.

The afore-mentioned conductivity electrodes preferably have inner bore diameters that coincide with the hose or nozzle inner diameter to minimize build-up of slurry material on electrode surfaces.

The use of electrodes and metering device allows a correlation between slurry conductivity and yield to be made based on actual field testing results. Accordingly, the present invention facilitates automatic or manual adjustment of accelerator injection rates into the slurry as conductivity measurements fall below or rise above a predetermined level. In further methods and devices of the invention, visual and/or audible alarms can be used to indicate when levels of accelerator are deviating from pre-determined levels or require critical adjustment.

In this manner, the present invention is believed to provide more consistently high yield spray-applications, because monitoring and control of accelerator levels is achieved by using a sensor which provides an indication of the actual levels within the hose or nozzle, and this is believed to be much more accurate than prior art volumetric methods which merely monitor the flow rate of accelerator being pumped through the tubing on its way to the hose or nozzle. In other words, accuracy in the present invention is not hindered by blocked, kinked, or leaking tubing or connectors.

The present invention also provides a settable slurry spray application system and device that are accurate, durable, convenient, and economical. The above-described sensors may be housed in a rigid sleeve made of dielectric material, such as polyethylene or polyamide, which can be screwed and/or clamped between hose sections, between hose and nozzle; or the sensors may be incorporated directly into the nozzle itself.

Further advantages, benefits, and features of the present invention are described in further detail hereinafter.

DETAILED DESCRIPTION OF PREFERRED EMBODIMENTS

Figure 1:
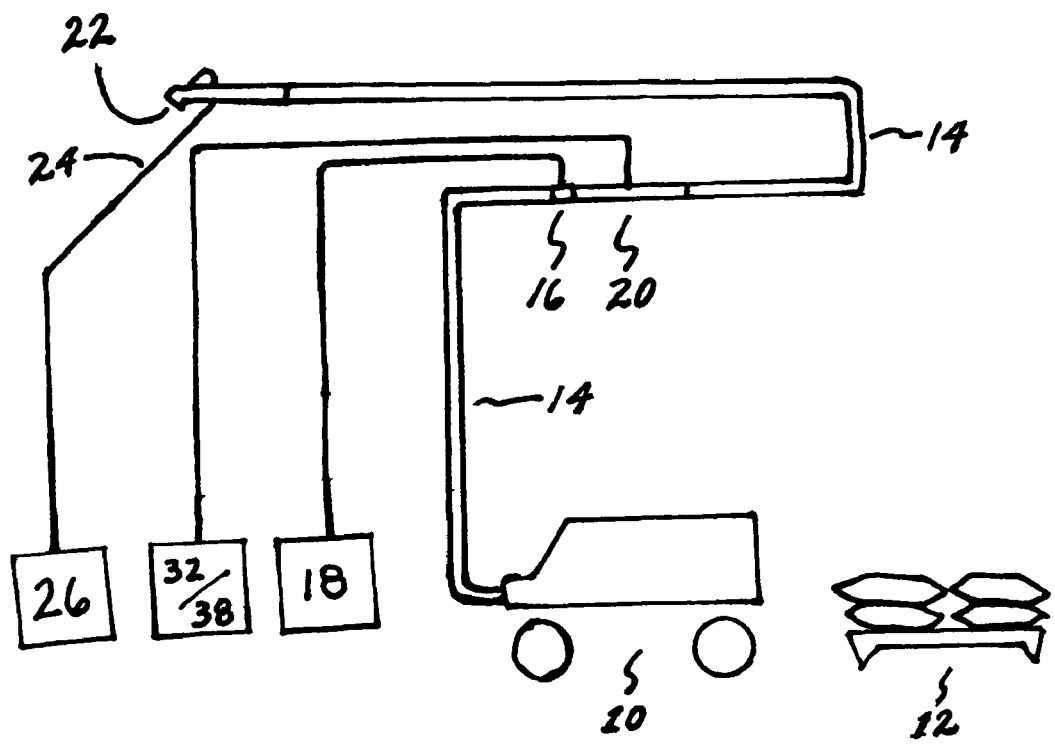
FIG. 1 is a schematic drawing of an exemplary spray application of the present invention for settable slurry compositions.

As used herein, the term "settable slurry composition" means and refers to compositions comprising an inorganic binder material, which, upon mixing with water, form a hydratable slurry that can be pumped through the length of a hose and spray-applied by nozzle onto a substrate.

The term "yield" means the volume of spray-applied slurry composition, after setting, per given weight of dry inorganic binder material used to prepare the settable slurry composition.

Typical inorganic binder materials contemplated for use in the settable slurry compositions include Plaster of Paris, stucco, gypsum, Portland cement, aluminous cement (e.g., a calcium sulphoaluminate cement, a high alumina cement), pozzolanic cement (e.g., finely ground blast furnace slag or fly ash, silica fume), gunite, magnesium oxychloride, magnesium oxysulfate, or mixtures thereof. Suitable settable slurry compositions are disclosed, for example, in U.S. Pat. No. 4,751,024 of Shu et al.; U.S. Pat. No. 4,904,503 of Hilton; U.S. Pat. No. 5,034,160 of Kindt et al.; U.S. Pat. Nos. 5,340,612 and 5,401,538 of Perito; U.S. Pat. No. 5,520,332 of Gaidis et al.; U.S. Pat. No. 5,556,578 of Berneburg et al.; U.S. Pat. No. 6,162,288 of Kindt et al.; and WO 03/060018 of Hilton, all incorporated by reference herein.

A preferred settable slurry composition is sold by W. R. Grace & Co.-Conn., Cambridge, Mass., under the MONOKOTE® tradename. Such a sprayable fireproofing slurry composition comprises shredded expanded polystyrene, as well as other components, such as known set retarding agents (See e.g., U.S. Pat. No. 6,162,288 of Kindt et al.).

A wide variety of alternative aggregate and filler materials may be employed within the settable slurry. These include exfoliated vermiculite, expanded perlite, diatomaceous earth, a refractory filler such as alumina or grog or colloidal silica, ceramic fibers, mineral fibers, glass fibers, common mixed paper waste, paper mill sludge, pulp, cellulose and the like, or agricultural fibers such as fibers extracted from wattle bark, palm fiber, kenaf, reeds, and natural organic particles such as ground cork and sawdust.

Fibers may comprise dry synthetic particles or fibers such as organic particles derived from milled thermoplastic foams, for example, phenol formaldehyde resole resin foams, urea formaldehyde foams, and polyurethane rigid or flexible foams; and organic fibers such as carbon, aramid, polyacrylonitrile, polyvinyl alcohol, polyethylene, polypropylene, polyester, acrylics, and mixtures thereof.

Exemplary set accelerators useful for accelerating the setting of slurry compositions of the present invention may include those conventionally known. As described in U.S. Pat. No. 5,520,332 of Gaidis et al., owned by the common assignee hereof, set accelerators are preferably low viscosity fluids which are injected into the slurry to decrease its set time upon a substrate. Acidic set accelerating agents capable of satisfactorily offsetting the retardation of the slurry can be used. For most commercial applications, the type and amount of accelerator is that which rapidly converts the setting time from about 4 to 12 hours to about 5 to 10 minutes. The amount required to provide such setting times will vary depending on the accelerator and the type and amount of retarder and binder. Generally, an amount in the range of about 0.1% to 20% by weight of dry accelerator based upon the weight of dry cementiitous binder is used, with about 2% being preferred. Examples of useful accelerators include aluminum sulfate, aluminum nitrate, ferric nitrate, ferric sulfate, ferric chloride ferrous sulfate, potassium sulfate, sulfuric acid, and acetic acid, with aluminum sulfate being preferred.

Conventional set accelerator injector ports 16 or mechanisms may be employed for introducing low viscosity liquid accelerators into low viscosity liquids, especially those employed in the fire protection spray application industry and shotcrete industries. Suitable mechanisms have been disclosed, for example, in U.S. Pat. No. 4,934,596 of Hilton et al. and U.S. Pat. No. 5,520,332 of Gaidis et al., incorporated herein. In the '332 patent, Gaidis et al. disclosed a check-valve-injector port which comprises a tube have a plurality of slits along its length which was inserted into the slurry path. The tube is made of a stretchable material which allows the tube to expand so that the slits pop open. The accelerator is injected into the slurry path under pressure through the opened slits. If there is a surge in the slurry pressure, the slits can close, thereby preventing infiltration of slurry which could block the tube. Other set accelerator agent injector designs may also be employed for introducing the accelerator into the slurry path within the hose or nozzle.

For the purpose of generating gas or foam within the slurry, it is desirable to employ a basic material. The term "basic material" refers to any material which reacts with the acidic set accelerating agent used in the compositions with resultant evolution of a gas and volume expansion of the slurry. Preferably, this basic material is added to the slurry composition and is not naturally occurring in the cementitious binder. Exemplary basic materials that can be added to the slurry binder to generate gas when combined with the set accelerator include carbonates such as calcium carbonate, sodium carbonate, sodium bicarbonate, or mixtures thereof.

As shown in FIG. 1, a mixer 10 is used for combining water and a cementitious binder 12 to provide a pumpable and settable slurry which is conveyed through the length of a hose 14 towards a nozzle having a spray-orifice, as generally designated at 22. Typically the nozzle is formed of a metal, such as aluminum, steel, or other rigid material. Pressurized air is pumped through an air hose 24 to the nozzle and through the nozzle spray-orifice 22 by a powered air pump 26 to propel the slurry from the nozzle onto a substrate (such as a steel beam or panel, not shown).

In a preferred embodiment of the present invention, an accelerator (the tank of accelerator and pump both being designated at 18) is pumped into the hose 14 through an accelerator injection port designed at 16 located along the hose at a distance "D" from the nozzle spray-orifice 22. Although the accelerator injection port may be on the nozzle or in proximity to the nozzle, more preferably the distance "D" between the accelerator injection port 16 and nozzle spray-orifice 22 no less than ten feet and no greater than one hundred feet; and more preferably it is located fifteen to seventy-five feet from the nozzle spray-orifice 22 to allow the acidic set accelerator injected into the slurry (through injection port 16) to react with basic material contained in the slurry and to generate gas that will increase the yield of the slurry when sprayed and dried upon the substrate.

Figure 2:
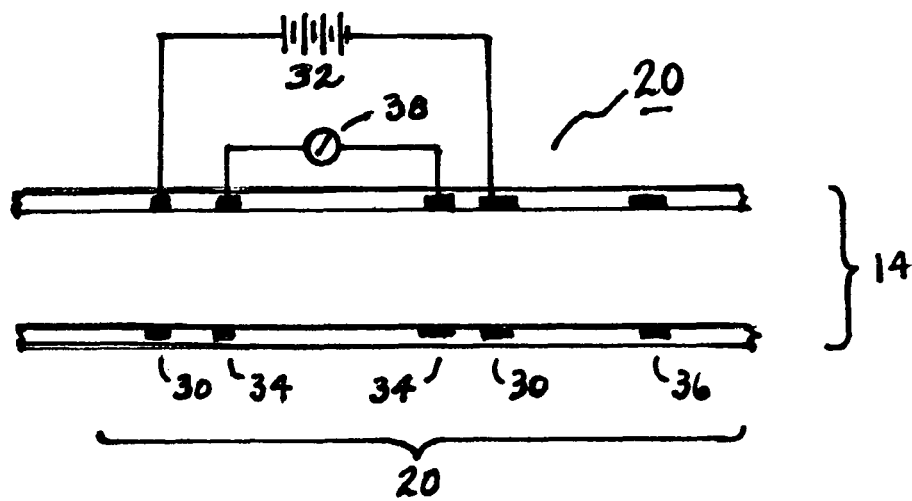
FIG. 2 is a cross-sectional diagram of an exemplary sensor of the invention for sensing the levels of set accelerator introduced into a hose-conveyed settable slurry composition.

A sensor 20 is employed to monitor the actual amount of set accelerator introduced into the slurry, at a point designated at "20" which is located at a distance less than "D" from the nozzle spray-orifice 22. The sensor 20 is preferably electrically or electronically connected to a power source 32 (which may be a direct current or alternating current source) and metering device 38. The power source 32 and metering device 38 may be conveniently located near the operator of the mixer 10 to permit automatic or manual adjustments to be made at the pump 18 which feeds accelerator into the slurry.

Where the set accelerating agent introduced into the slurry is a water-soluble salt, the sensor 20 can be a conductivity sensor that is operative to provide an indication of the conductivity of the aqueous slurry. As shown in FIG. 2, an exemplary sensor 20 comprises a conductivity sensor operative to provide an indication of the conductivity of the slurry at said distance less than "D" from the nozzle spray-orifice. Preferably, the sensor 20 comprises an assembly of electrodes which are physically isolated from each other and mounted within a hose, housing sleeve, or nozzle so as to come into electrical contact with slurry. The material used for construction of the electrodes can be any electrically conductive material. 316 Stainless Steel has been commonly used to manufacture the electrodes.

As shown in FIG. 2, the sensor 20 assembly comprises a first pair of electrodes 30, which are spaced apart and aligned with the bore of the hose, housing sleeve, or nozzle. These are operative to generate a voltage field within a portion of the slurry when a voltage source 32 is connected to this first electrode pair 30. A second pair of electrodes 34 is also spaced apart but located between the two first pair electrodes 30, and are connected to a meter 36 or other conductivity detection device which is operative to detect voltage differences between the first pair of electrodes 30. A portion of the hose or separate housing sleeve is generally designated as at 14 and is used to physically and electrically isolate the electrodes 30/34 from each other and from the external environment.

The electrodes 30 and 34 preferably each have an annular body (preferably a hollow cylinder shape) with a bore aligned with and similar diameter with the bore of the hose 14 (or nozzle if situated in or in proximity to the nozzle). While electrode shapes such as strips and rectangles can be used as an alternative to an annular, the annular body shape 30/34 is preferred because some portion of the electrode surfaces must come into electrical contact with slurry thereby providing a more reliable conductivity level reading. In addition, an annular shape that is aligned with the bore (no protruding surfaces relative to the surrounding surfaces) will prevent slurry material from accumulating against any protruding electrode surfaces.

Hence, an exemplary method for spray-applying a settable slurry, comprises: conveying a settable slurry through a length of hose 14 to a nozzle spray-orifice 22 from which the conveyed slurry is spray-applied onto a substrate (not shown); introducing a set accelerating agent 16 into the slurry at a distance "D" from the nozzle spray-orifice 22; and monitoring 22 the level of set accelerating agent in the slurry, at a distance less than "D" from the nozzle spray-orifice, by employing a sensor 20 to detect changes in a physical property of the slurry corresponding to levels of set accelerating agent being introduced into said conveyed slurry.

Preferred devices and methods of the invention comprise the use of a sensor 20 in the hose 14 at a point in the length of a hose located between the set accelerator injection point 16 and the nozzle spray-orifice 22. Preferably, the sensor 20 comprises a first pair conductivity electrodes 30 which are spaced apart a distance from each other. These electrodes 30 are operative to generate a voltage field through slurry in the area between the electrodes when a power source 32 is electrically connected to them. A second pair of conductivity electrodes 34 are spaced apart a distance from each other and located between said first conductivity electrode pair 30. This second pair of electrodes 34 is operative to detect voltage differences between the first conductivity electrode pair 30 when a voltage meter 38 or other detector device is connected to this second electrode pair 34.

In further exemplary embodiments, a voltage meter 38 may be connected to warning lights and/or alarms to provide indication to the operator when the conductivity drops below or rises above a predetermined limit, and may be used to control automatically the injection of set accelerator.

In further exemplary devices and methods of the invention, at least one temperature sensor 36 may be employed in an area of the hose 14 operative to measure the temperature of the slurry in the neighborhood of the conductivity sensor electrodes 30/34. As shown in FIG. 2, a temperature sensor 36 may also comprise an annular body with a bore that coincides with the inner bore diameter of the hose 14. As electrical conductivity of the slurry can be affected by its temperature, the use of a temperature sensor 36 permits temperature deviations to be taken into account, thus providing greater accuracy in conductivity readings.

The conductivity electrodes 30 and 34, as well as the temperature sensor 36, are preferably mounted and embedded within a sleeve housing which is preferably made of a non-conductive material such as polyethylene, polyamide, or other electrically non-conductive material. The electrodes 30/34 and temperature sensor 36 are thus protected from potential damage caused by slurry conveyed through the hose 14. As mentioned above, the inner bore diameter of the electrodes and the sleeve housing within which they are mounted is preferably the same as that of the hose 14, which can be attached by a screw, clamp, or other known mechanism to the sleeve housing. The outer circumferential diameter of the sleeve housing, of course, may be larger than the outer diameter of the hose as may be necessary to provide structural integrity to resist internal pressure of the pumped slurry as well as external damage due to dropping.

An operator will operate the spray equipment until a desired yield level is achieved by the slurry when spray-applied and set upon a substrate surface such as a steel beam or panel. The yield measurement of commercial fireproofing slurries, such as GRACE's MONOKOTE product, is typically done by measuring cup weight a known volume of slurry exiting from the nozzle spray-orifice. When a desired cup weight yield (i.e., density) is obtained at the nozzle for a given level of set accelerator introduced into the hose (via accelerator injector port designated as at 16), slurry conductivity as determined by voltage meter 38 can be correlated with a desired yield.

During an actual application of the slurry at a job site, it is preferable to locate the meter 38 (as shown in FIG. 2) next to the mixer 10 (FIG. 1) so that the mixer operator can make adjustments to the accelerator pump 18.

In further exemplary embodiments, the metering device 38 can be connected to visual and/or audible alarms to provide the operator of the spray nozzle 22 or the operator the mixer 10 an indication of the slurry conductivity level, and hence accelerator level, in the slurry. For example, when the meter 38 is manually set to the conductivity of the slurry that corresponds to a desired yield value (and hence desirable set accelerator level), an indicator which may be in the form of visible light, alphanumeric display, audible alarm or vibratory sensor (such as a paging device) may be used to indicate that an acceptable or unacceptable process condition exists. If the conductivity of the slurry rises above or falls below a predetermined level, indicating that a possible process deviation exists, an indication would be provided to the appropriate person that the set accelerator level should be checked. If the conductivity of the slurry is above or beyond a predetermined critical level, indicating that a process deviation condition exists that must be corrected, a revised indication would be provided.

In still further exemplary embodiments of the invention, the process can be automated through the use of a computer processing unit ("CPU"), such as a lap top computer of a programmable logic controller (PLC). For example, the metering device 38 and accelerator pump 18 can both be connected to a CPU or PLC such that the rate of set accelerator pumped 18 into slurry (via injection port 16) can be correlated and adjusted automatically depending upon the sensor 20 information fed back to the metering device 38.

In still further exemplary embodiments, the sensor 20 may be a pH sensor which is operative to detect levels of acidic set accelerator injected into the hose 16. Other sensors may be employed, such as ultrasonic, optical, and capacitive sensors. However, the use of electrical conductivity sensors is most preferred for reasons of sensitivity and robustness, while pH sensors were next in order of preference for these reasons.

As will be evident from the description of the foregoing methods, the present invention provides an apparatus for spray-application of settable compositions, comprising a hose 14 for conveying a settable slurry to a nozzle spray-orifice 22, a set accelerator injection port 16 located along said hose 14 (or at or near the nozzle) at a distance "D" from the nozzle spray-orifice 22, and a sensor 20 located within the conveyed slurry path at a distance less than "D" from the nozzle spray-orifice 22, the sensor 20 operative to provide an indication correlating with the level of set accelerator introduced into the conveyed slurry.

Preferred devices of the present invention for achieving consistently high yields of spray-applied settable slurry composition comprise a plurality of conductivity electrodes 30 and 34 each having annular bodies, as shown in the cross-sectional perspective of FIG. 2, contained within a housing sleeve (14) which could be the hose itself or, more preferably, a rigid housing sleeve made of non-conductive material such as polyethylene, polyamide, or other electrically non-conductive material. As previously explained, a preferable arrangement is to have a first pair of field electrodes 30 for generating an electric field when the electrodes 30 are connected to a voltage source 32' and a second pair of electrodes 34 located between the first electrode pair 30 and along the slurry path for measuring the voltage difference in the slurry when the second electrode pair 34 is connected to a voltage meter 38 or other measurement device.

The foregoing examples are provided for illustrative purposes only and are not intended to limit the scope of the invention.

The invention claimed is:

1. A method for spray-applying a settable slurry, comprising:

conveying a settable slurry through a length of hose to a nozzle spray-orifice;

introducing an amount of set accelerating agent into said conveyed slurry at a distance "D" from said nozzle spray-orifice;

monitoring conductivity of said slurry at a distance less than "D" from said nozzle spray-orifice by employing a conductivity sensor, wherein the conductivity of said slurry corresponds to the amount of set accelerating agent introduced into said slurry; and adjusting the amount of set accelerating agent introduced into said slurry if the conductivity of said slurry deviates from a predetermined value.

2. The method of claim 1 wherein said slurry comprises Plaster of Paris, stucco, gypsum, Portland cement, aluminous cement, pozzolanic cement, gunite, or mixtures thereof.

3. The method of claim 2 wherein said slurry comprises gypsum.

4. The method of claim 2 wherein said slurry further comprises an aggregate.

5. The method of claim 1 wherein said set accelerating agent is a water-soluble salt.

6. The method of claim 5 wherein said distance "D" is no less than five feet and no greater than 100 feet from said nozzle spray-orifice.

7. The method of claim 6 wherein said set accelerating agent is selected from the group consisting of aluminum sulfate, aluminum nitrate, ferric nitrate, ferric sulfate, ferric chloride ferrous sulfate, potassium sulfate, sulfuric acid, and acetic acid.

8. The method of claim 1 wherein said set accelerating agent is aluminum sulfate; wherein said slurry is gypsum, Portland cement, or a mixture thereof; and wherein said slurry further comprises a basic material which, upon contact with said set accelerating agent, generates a foam within said slurry.

9. The method of claim 1 wherein said sensor comprises an assembly of electrodes in physical contact with said slurry, said electrode assembly comprising a first pair of electrodes operative to generate a voltage field within a portion of said slurry when a voltage source is connected to said first electrode pair, and a second pair of electrodes operative to detect voltage differences between said first pair of electrodes when a voltage meter is connected to said second electrode pair.

10. The method of claim 9 wherein said electrodes each have an annular body with a bore aligned with the hose or nozzle inner diameter.

11. The method of claim 10 wherein said annular electrodes are mounted within a sleeve housing operative to isolate electrically said annular electrodes from each other.

12. The method of claim 9 further comprising at least one temperature sensor operative to measure the temperature of slurry in an area proximate to said sensor.

13. The method of claim 1 wherein said sensor is a conductivity sensor comprising a plurality of electrodes operative to provide an indication correlating with the electrical conductivity of said slurry, said electrodes being connected to a meter; said method comprising adjusting the amount of set accelerating agent introduced into said slurry in response to said indication correlating with the electrical conductivity of the slurry at a point after said accelerating agent is introduced into said slurry.

14. The method of claim 13 wherein said indication is a visible light, alphanumeric indication, audible alarm, vibratory device, or combination thereof.

15. The method of claim 1 wherein said method utilizes a spray-application device comprising a hose for conveying a settable slurry to a nozzle spray-orifice, a set accelerator injection port located along said hose at a distance "D" from said nozzle spray-orifice, and a sensor located along said hose at a distance less than "D" from said nozzle spray-orifice, said sensor operative to measure conductivity of said slurry and thereby provide an indication correlating with the amount of set accelerator introduced into the slurry.

16. A method for spray applying a settable composition, comprising:
conveying a settable cementitious slurry comprising gypsum, Portland cement, or mixture thereof through a length of hose to a nozzle spray-orifice from which said conveyed cementitious slurry is spray-applied onto a substrate, said slurry further comprising at least one aggregate and a basic material;
introducing an amount of acidic set accelerating agent into said hose-conveyed slurry at a distance "D" from said nozzle spray-orifice, said acidic set accelerating agent operative to react with said basic material contained within said slurry and to increase the yield thereof when spray-applied through said nozzle spray-orifice onto a substrate;
monitoring the level of said acidic set accelerating agent in said conveyed slurry, at a distance less than "D" from said nozzle spray-orifice, by employing a sensor to detect changes in a physical property of said slurry corresponding to the amount of set accelerating agent being introduced into said slurry, said sensor comprising an assembly of electrodes in physical contact with said slurry, said electrode assembly comprising a first pair of electrodes operative to generate a voltage field within a portion of said slurry when a voltage source is connected to said first electrode pair, and a second pair of electrodes operative to detect voltage differences between said first pair of electrodes when a voltage meter is connected to said second electrode pair; and
adjusting the amount of set accelerating agent introduced into said slurry if said voltage differences indicated by said voltage meter deviate from a predetermined value.

* * * * *